No. 890,778. PATENTED JUNE 16, 1908.
W. S. LIVENGOOD.
ROAD GRADER.
APPLICATION FILED OCT. 29, 1907.

3 SHEETS—SHEET 1.

Witnesses:—
R. C. Hamilton
M. Cox

Inventor,
W. S. Livengood
By F. G. Fischer
Atty.

THE NORRIS PETERS CO., WASHINGTON, D. C.

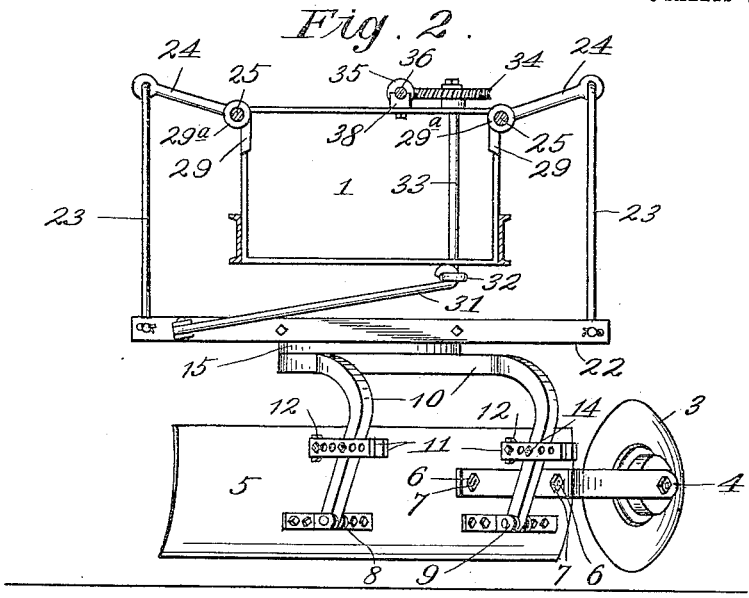

No. 890,778. PATENTED JUNE 16, 1908.
W. S. LIVENGOOD.
ROAD GRADER.
APPLICATION FILED OCT. 29, 1907.

3 SHEETS—SHEET 3.

Witnesses:—
R E Hamilton
M. Cox.

Inventor,
W. S. Livengood
By F. G. Fischer Atty.

UNITED STATES PATENT OFFICE.

WINFIELD S. LIVENGOOD, OF KANSAS CITY, MISSOURI, ASSIGNOR TO SMITH & SONS MFG. CO., OF KANSAS CITY, MISSOURI.

ROAD-GRADER.

No. 890,778.  Specification of Letters Patent.  Patented June 16, 1908.

Application filed October 29, 1907. Serial No. 399,770.

*To all whom it may concern:*

Be it known that I, WINFIELD S. LIVENGOOD, a citizen of the United States, residing at Kansas City, in the county of Jackson and State of Missouri, have invented certain new and useful Improvements in Road-Graders, of which the following is a specification.

My invention relates to improvements in road graders; and my object is to provide a machine whereby the surface of a road may be leveled more quickly and with less expenditure of power than has heretofore been possible with a machine of this character.

Figure 1:
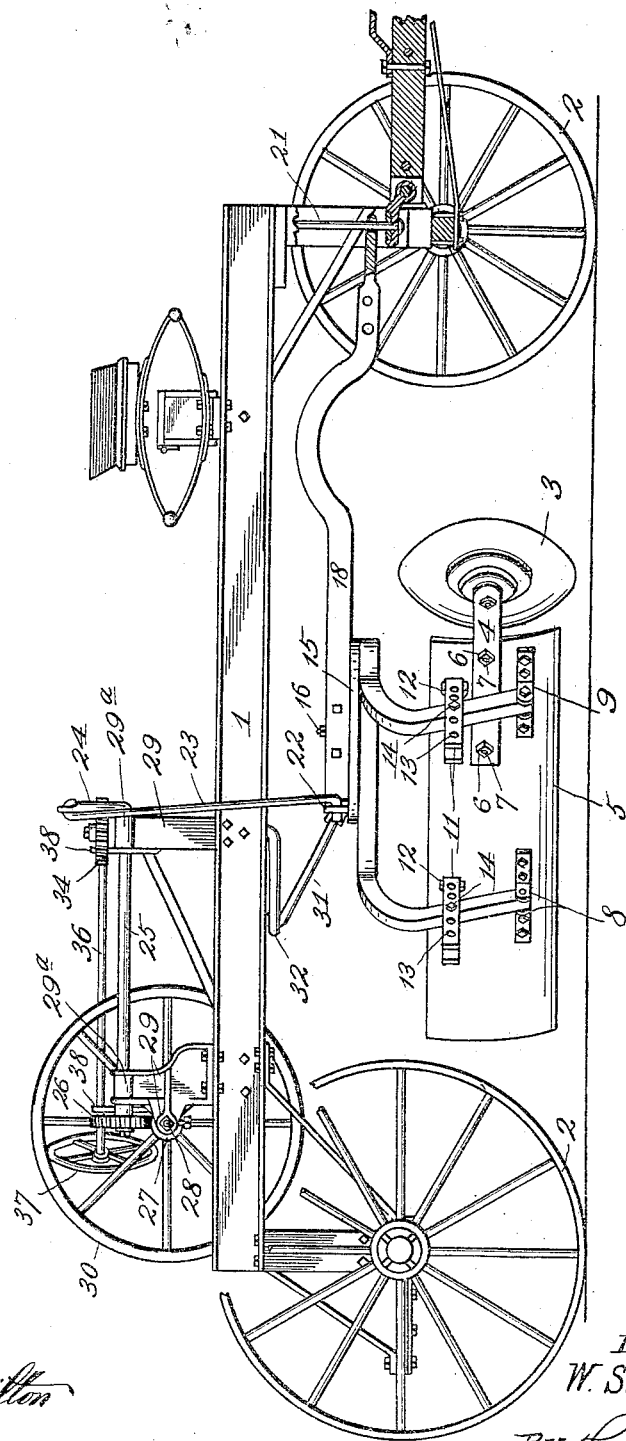
Figure 4:
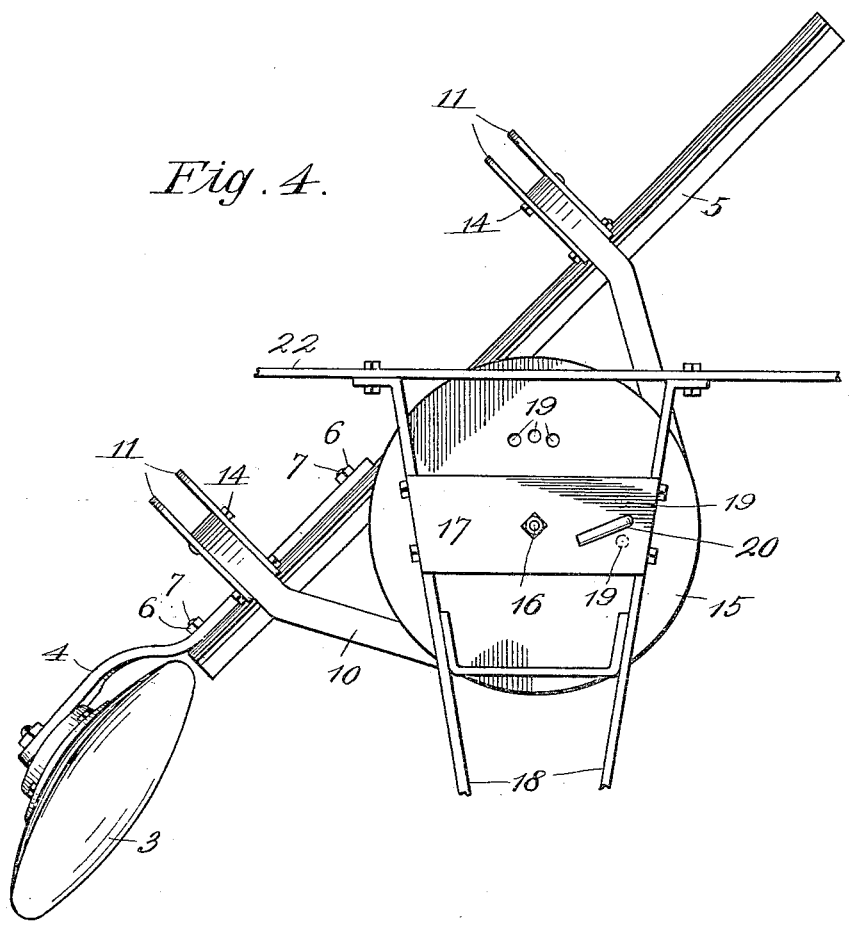
Figure 5:
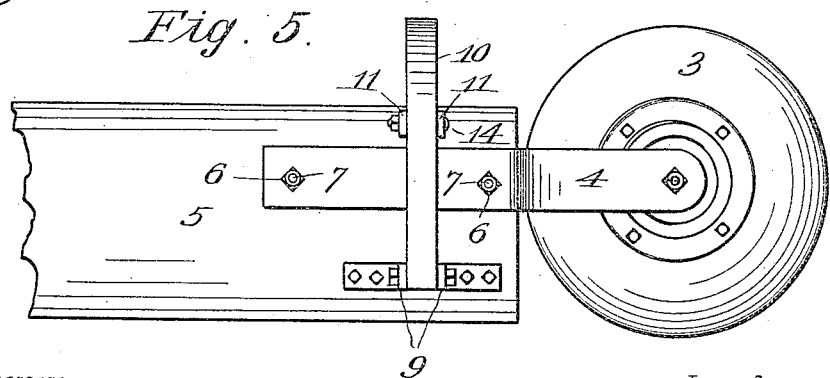

A further object is to provide a machine adapted to cut away banks at the side of the road when it is desired to widen the same, and in order that the invention may be fully understood reference will now be made to the accompanying drawings, in which:

Figure 1 represents a side elevation of a grading machine provided with my improvements. Fig. 2 is an irregular cross section of the same on line II—II of Fig. 3. Fig. 3 is a broken plan view of the rear portion of the grader. Fig. 4 is an enlarged detail plan view of the improvement. Fig. 5 is an enlarged rear elevation of the same.

1 designates the frame of the grader which is mounted upon carrying-wheels 2.

3 designates a rotary cutter forming one of the important features of the invention, which is carried at one end of an arm 4 removably secured to one end of a scraper-blade 5 by nuts and bolts 6 and 7, respectively. Said arm is bent at its forward end to throw the rotary cutter slightly out of line with the scraper-blade, the object being to get the cutter more nearly parallel to the line of advancement than the scraper-blade so that it will operate with less friction. The lower portion of the cutter is, preferably, arranged slightly below the lower edge of the scraper-blade so that it will cut and loosen the dirt in advance of said blade instead of compelling the latter to perform this operation, as it is obvious that the scraper-blade can spread the loose dirt more readily and with less labor on the part of the team, than if it had to loosen as well as spread the soil.

Blade 5 is provided near its ends with ears 8 and 9, which latter are arranged nearer their respective end of the blade than the former to better resist the strain imposed upon the forward end of the blade by the rotary cutter. Ears 9 are pivotally secured to the terminals of a yoke-shaped bar 10, so that the scraper-blade and the rotary cutter may be adjusted to any desired inclination where they are held by arms 11, pivotally secured to eyes 12 on the scraper-blade and provided with holes 13 for the reception of bolts 14 extending through the depending portions of the yoke-shaped bar for the purpose of holding the scraper-blade and the rotary cutter at the inclination to which they have been adjusted.

The scraper-blade and the rotary cutter are adjusted at any desired angle to the line of advancement by means of a turn-table 15 carrying the yoke-shaped bar 10, and mounted upon a bolt 16 extending through a brace 17 carried by a pair of draft-bars 18. Turntable 15 is provided with a series of holes 19 adapted to receive a pin 20 extending through brace 17 for the purpose of locking the turn-table after the scraper-blade and the rotary cutter have been adjusted to the desired angle.

Draft-bars 18 are pivotally secured at their forward ends to a king-bolt 21 and at their rear ends to a cross-bar 22 which is supported by a pair of links 23 depending from a pair of cranks 24 on the forward ends of a pair of shafts 25 provided at their rear ends with a pair of worm-wheels 26, intermeshing with a pair of worms 27 fixed upon a cross-shaft 28 mounted in bearings 29 which are carried on frame 1, and have boxes 29ª in which shafts 25 are journaled. Shaft 28 is provided with a pair of hand-wheels 30. By turning said hand-wheels in one direction the scraper-blade and the rotary cutter will be lowered to the ground, and by turning them in the opposite direction said scraper-blade and rotary cutter will be raised.

The scraper-blade and rotary cutter are adjusted laterally to the line of advancement by mechanism consisting of a link 31 loosely secured at one end to cross-bar 22, a crank 32 to which the opposite end of said link is loosely secured, a vertical shaft 33 provided at its lower end with the crank 32, a worm-wheel 34 fixed to the upper end of shaft 33, a worm 35 intermeshing with worm-wheel 34, a shaft 36 to one end of which the worm is fixed, and a hand-wheel 37 at the opposite end of said shaft. Shaft 33 is journaled in frame 1, and shaft 36 is journaled in a pair of bearings 38.

In practice the scraper-blade and the rotary cutter are preferably adjusted to the angle shown in Figs. 3 and 4, as the cutter performs its work at this angle better than at any other. As the machine is drawn forward the rotary cutter will loosen the dirt and discharge it in the path of the following scraper-blade which spreads it out over the surface of the road and also assists the cutter in leveling off any raised places. If it is desired to widen the road between embankments, the scraper-blade and the rotary cutter are shifted laterally to the line of advancement to bring the cutter into contact with the bank nearest thereto, so that it may cut away the side of the bank until the road has been widened to the desired point.

Having thus described my invention, what I claim is:

1. In a grading-machine, the combination of a scraper-blade, and a rotary cutter carried at one end thereof, substantially as described.

2. In a grading-machine, the combination of a scraper-blade, a rotary cutter carried at one end thereof, and means for adjusting the scraper-blade and the rotary cutter laterally to the line of advancement.

3. In a grading-machine, the combination of a scraper-blade, a rotary cutter carried at one end thereof, and means for raising and lowering the scraper-blade and the rotary cutter.

4. In a grading-machine, the combination of a scraper-blade, a rotary cutter carried at one end thereof, and means for changing the inclination of the scraper-blade and the rotary cutter.

5. In a grading-machine, the combination of a scraper-blade, a rotary cutter carried at one end thereof, and means for adjusting the scraper-blade and the rotary cutter to any desired angle with the line of advancement.

6. In a grading-machine, the combination of a scraper-blade, an arm projecting from one end thereof, and a rotary cutter carried by said arm, said rotary cutter being arranged at a slight angle to the scraper-blade.

In testimony whereof I affix my signature, in the presence of two witnesses.

WINFIELD S. LIVENGOOD.

Witnesses:
F. G. FISCHER,
M. COX.